United States Patent Office 3,101,963
Patented Aug. 27, 1963

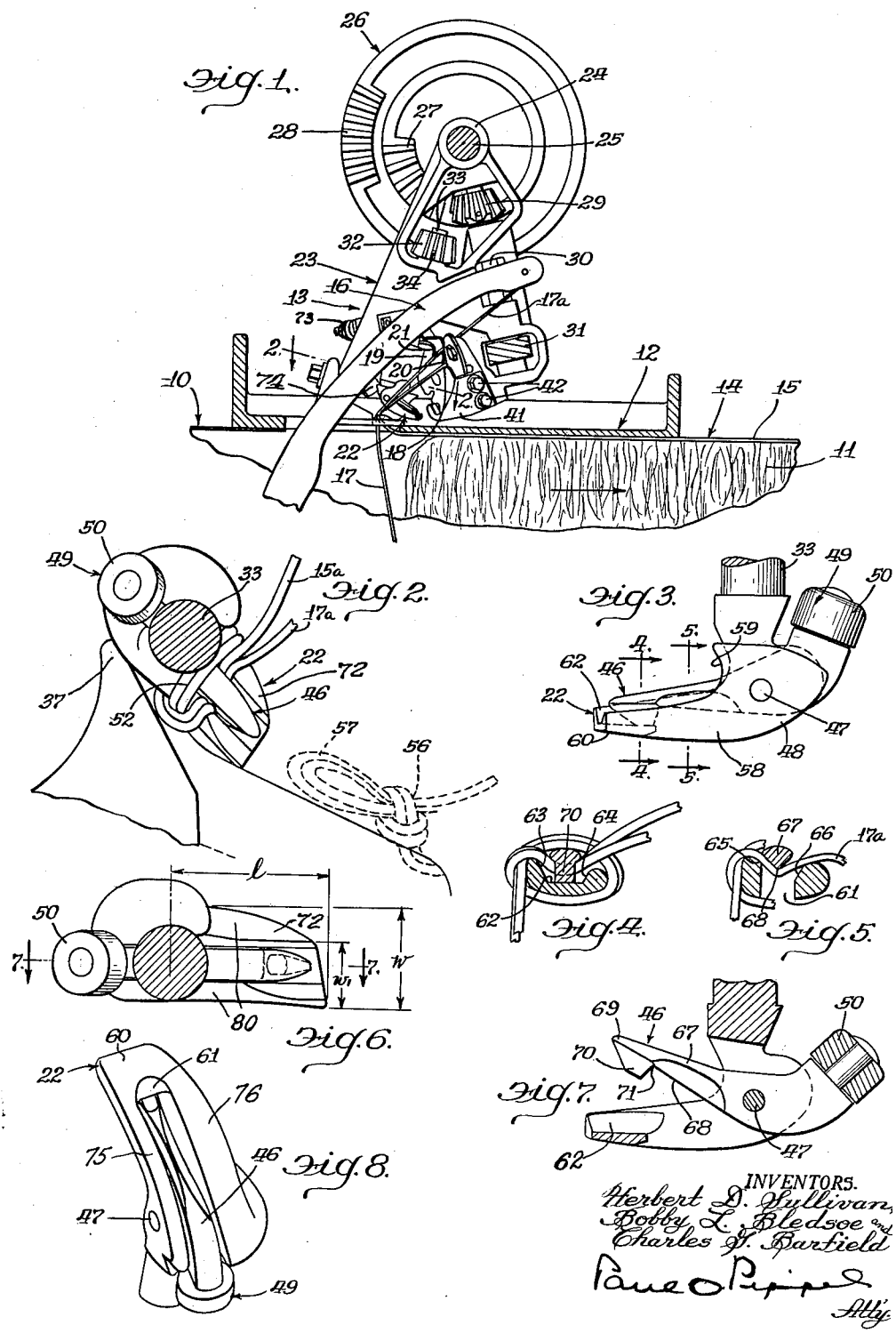

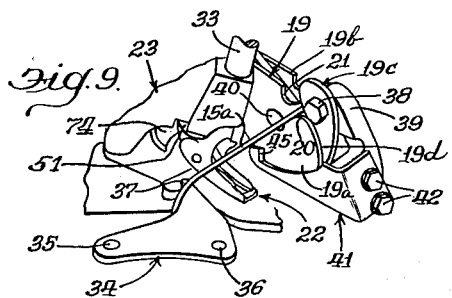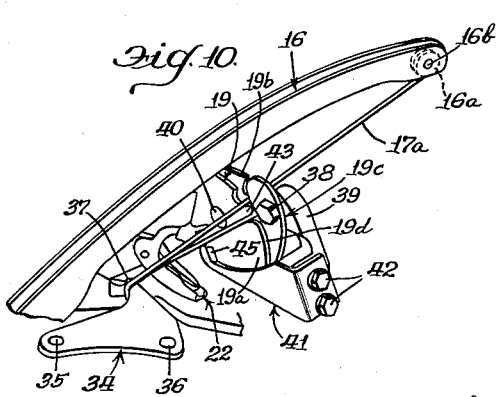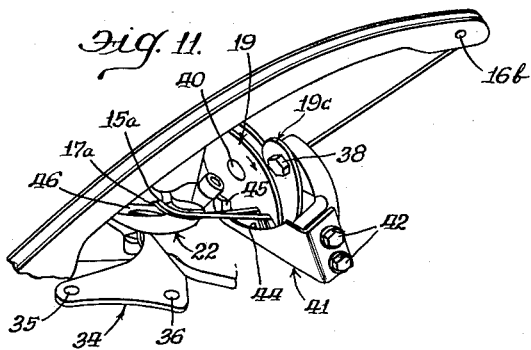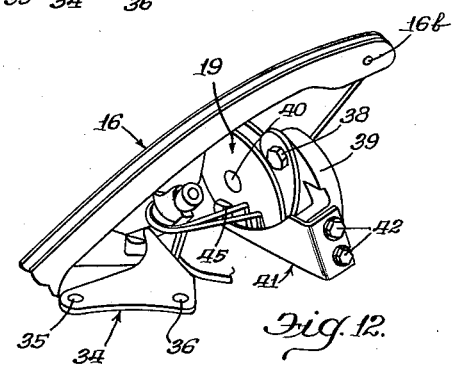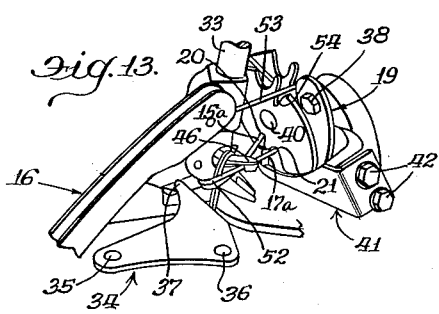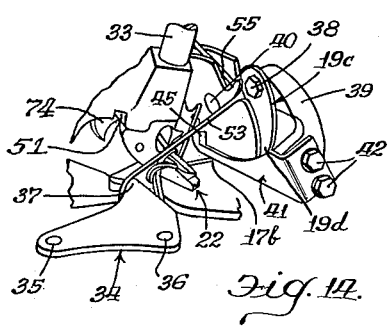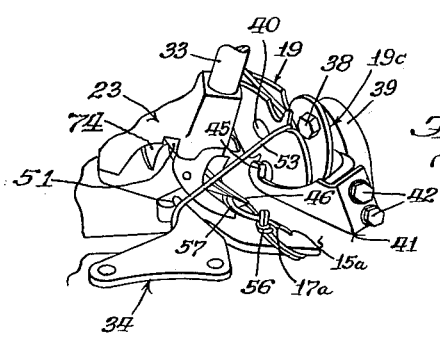

3,101,963
KNOTTER HOOK FOR BALERS
Herbert D. Sullivan and Bobby Lynn Bledsoe, Memphis, Tenn., and Charles G. Barfield, West Memphis, Ark., assignors to International Harvester Company, Chicago, Ill., a corporation of New Jersey
Filed Apr. 17, 1961, Ser. No. 103,543
7 Claims. (Cl. 289—11)

This invention relates to a new and improved knotter hook for hay balers or the like.

Knotters for the tying of bundles of hay or grain have been in existence for many years. An example of such a knotter for a grain binder is shown in the patent to Appleby 262,883, dated August 15, 1882. Very few changes have been incorporated in the knotter disclosed by Appleby within the past eighty years. The Appleby knotter was initially used on grain binders and then was applied to automatically tying hay balers. However, in principle the Appleby knotter is still very much in evidence on present-day balers. The Appleby type of knotter has contributed materially to the successful tying of bundles of grain for binders and for bales of hay or straw in balers. Now, although present-day knotters successfully complete approximately 98 percent of the twine knots, the users object to even 2 percent of twine knots which may be missed.

With the aid of high speed photography of both motion and still pictures the inventors have discovered certain weaknesses in the present knotter which the device of the present invention is to overcome. Even though the changes may appear to be slight, each one of them contributes to the fully successful operation of the knotter.

It is, therefore, a principal object of the present invention to provide a knotter hook for a twine knotter with various improvements therein to provide an overall knotter which is substantially 100 percent efficient.

An important object of this invention is to provide a knotter hook having increased length and simultaneously increased width whereby the increased length insures positive pickup of bale twines and the increased width provides more twine in a tight wrap on the hook and yet the combination of increased length and width of hook provides for effective knot stripping from the hook by reason of the retention of substantially the same degree of taper of the hook from the heel thereof to the toe.

Another important object of this invention is to provide a knotter hook with increased slot length and width.

Still another important object of this invention is the provision of means in a twine knotter bill hook of a hinged jaw having a chisel edge on the underside thereof and adapted to cooperate with the slot in the bill hook.

Another and further important object of this invention is to equip a twine knotter bill hook with a slot extending the length thereof from a position adjacent the toe and through the heel and the inner edges of the defined side arms being chamfered for proper cooperation with a hinged jaw to facilitate the rendering of twine through the bill hook with just the right amount of resistance.

A still further important object of this invention is the provision of a groove in the top surface of the toe of a knotter hook in alignment with the longitudinal slot in the hook and the inner edges of the groove and slot being chamfered to cooperatively receive a hinged jaw for rendering twine therethrough.

Other and further important objects and advantages will become apparent from the disclosures in the following specification and accompanying drawings.

In the drawings:

FIGURE 1 is a vertical sectional view of the knotter of this invention as mounted on the base plate of a hay baler.

FIGURE 2 is a sectional view taken on the line 2—2 of FIGURE 1.

FIGURE 3 is a side elevational view of the knotter hook-and-jaw assembly.

FIGURE 4 is an enlarged sectional view taken on the line 4—4 of FIGURE 3.

FIGURE 5 is an enlarged sectional view taken on the line 5—5 of FIGURE 3.

FIGURE 6 is a top plan view partially in section of the hook-and-jaw assembly as shown in FIGURE 3.

FIGURE 7 is a sectional view taken on the line 7—7 of FIGURE 6.

FIGURE 8 is a perspective view of the bottom of the hook-and-jaw assembly.

FIGURE 9 is a perspective view of the knotter of this invention preliminary to having a bale-encircling twine delivered thereto.

FIGURE 10 is another perspective view similar to that shown in FIGURE 9 with the needle carrying the bale-encircling twine strand to the knotter.

FIGURE 11 is another perspective view similar to that of FIGURES 9 and 10 with the needle in "up" position as in FIGURE 10 and with the knotter elements commencing to operate.

FIGURE 12 is another perspective view showing the succeeding stage in the operation of the knotter.

FIGURE 13 is a further perspective view of the knotter of this invention showing the twine-carrying needle receding from the knotter.

FIGURE 14 shows a still further successive stage in the operation of the knotting mechanism in which the bale-encircling strands of twine are looped about the knotter bill hook with the jaws clamping a portion thereof preliminary to stripping of the knot from the hook.

FIGURE 15 is another perspective view showing the final stage of knot formation in which the twine knot is being stripped from the knotter bill hook.

As shown in the drawings: The reference numeral 10 indicates generally a bale-forming chamber within which hay is compressed into a bale 11. A reinforcing base plate 12 is mounted on top of the generally rectangularly-shaped bale-forming chamber 10 and is utilized to carry a twine knotter mechanism 13. The bale-encircling strand is identified in toto by the numeral 14 and the individual portions thereof will be separately identified. For example, the portion of the strand 14 extending rearwardly in the bale-forming chamber 10 and lying on top of the bale is identified as 15. The strand 15 then continues down around the end of the bale 11 and thence along the bottom (not shown). A twine-carrying needle 16 is adapted to carry the end 17 of the strand 14 up over the forward end of the completed bale 11. The end 15a of the portion 15 of the strand 14 is clamped as shown at 18 in FIGURE 1 in a cord holder 19 having closely adjacent various depth notches 20 and 21 therein. The end 15a of the strand 14 which is a continuation of the rearwardly extending portion 15 passes over the twine knotter hook 22 and thence through the deepest notch 20 in the cord-holding disk 19. When the needle 16 brings up the end 17a of the portion 17 of the strand 14 to completely encircle the hay bale 11, it is passed over the bill hook 22 and into or through the adjacent shallower notch 21 in the cord-holder disk 19. During portions of time in the knot-tying operation, it is the function of the needle 16 to hold the strand in position across the bill hook and through the cord-holding mechanism. At the same time, twine must be rendered through the needle to provide sufficient twine to make a tie of the adjoining ends 15a and 17a of the twine 14.

The present invention is concerned primarily with the construction of the knotter bill hook 22 and its ability to make uniform knots and make these knots substantially 100 percent of the times that the bale-encircling needle 16 carries a new twine around the end of a bale 11 into the position as shown in FIGURE 1. FIGURES 9 through 15 show successive perspective views of the hook and related knotter parts showing the sequence of operations of a knot-tying cycle. It is believed that before we delve into the particular constructional features of the knotter bill hook, it might be desirable to first review the basic operations of the various elements of the knotter by discussing FIGURE 1 and FIGURES 9 through 15. The knotter 13 includes a housing in the form of a casting 23 which is provided with a sleeve-like hub 24 mounted on and around a driven shaft 25. Also mounted on the shaft 25 and driven thereby is a large gear element 26 having a first bevel gear track 27 mounted thereon and a second bevel gear track 28 mounted thereon. The gear tracks 27 and 28 are concentric to one another and the extent of the teeth in these bevel gear tracks is controlling in the amount of rotational operation of the various knotter elements. A bevel gear 29 is journaled within the housing casting 23 and carries with it a shaft 30. The bevel gear 29 is in engagement with the circular bevel gear track 27 so that when the teeth of the track 27 engage the bevel gear 29 rotation is imparted to the shaft 30. The shaft 30 carries a helical gear 31 at its lower end for delivering rotational drive to the cord-holding element 19.

The amount of rotation of the cord-holding disk 19 and the time of its rotation relative to the rotation of the other knotter elements is determined by the position of the mutilated bevel gear track 27 on the large disk-like gear element 26. The outer concentric mutilated bevel gear track 28 is adapted to engage a bevel gear 32 which is journally carried in the casting 23 much in the same manner as the bevel gear 29. The bevel gear 32 is mounted on a shaft or spindle 33 and is fastened thereto by means of a pin 34. The shaft 33 constitutes the shank of the knotter hook 22. Thus when the bevel gear 32 engages the teeth of the mutilated bevel gear track 28 the knotter hook 22 is rotated. It should be noted that the gear tracks 27 and 28 are not in alignment with one another on the gear element 26 and thus the cord holder 19 and the bill hook 22 do not rotate together but rather rotate at the particular time during the cycle that will effect a tying of a knot to be subsequently described.

As best shown in FIGURE 9, the knotter includes a breast plate 34 which is riveted or otherwise fastened at 35 and 36 to the base plate 12. The breast plate 34 includes an upwardly and inwardly extending finger or projection 37 around which the end 15a of the bale-encircling strand of twine 14 passes. The clamped end portion 15a of the twine is a continuation of that portion 15 of the twine which projects forwardly over the top of the bale and is held in the knotter from the preceding bale tie. Newly admitted hay to the chamber 10 to form a bale 11 is pushed against a continuation of a portion of the encircling strand to cause additional twine to be rendered out of a source of supply of the twine (not shown). The end portion 15a passes over the high finger 37 of the breast plate 34, over the hook member 22, and through the slot or notch 20 in the cord-holding mechanism 19. As shown in FIGURE 9 which is somewhat enlarged over the device as shown in FIGURE 1, the cord holder 19 includes spaced-apart disks 19a and 19b with an intermediate keeper element 19c. The keeper 19c is hinged on a bolt member 38 which is carried in an upper extension 39 of the casting 23. The lower end 19d of the keeper 19c passes between the spaced disks 19a and 19b to cause a clamping of the twine 15a between the disks. A hub or shaft element 40 passing centrally through the twine holder imparts rotational drive to the cord holder 19 through a means (not shown) joining with the helical gear 31. A knife means 41 is fastened by means of bolts 42 to a portion of the casting 23 in front of and at the bottom of the cord holder 19.

As shown in FIGURE 10, the twine-carrying needle 16 has moved up to a position over the knotter mechanism 13 wherein the strand end 17a, identified because it is a continuation of the end-encircling portion 17 of the strand 14, lies adjacent to the previous end 15a over the breast plate finger 37 in the crotch of the knotter hook 22. From this close relationship the strand ends separate as they pass through the adjacent notches 20 and 21 in the spaced-apart cord-holding disks 19a and 19b. The notches 20 and 21 and thus also the strands are separated by a finger element 43. The needle 16 carries a small V-pulley 16a on a pin 16b in the end thereof so that twine from a source of supply may be rendered through the needle and through the knotter mechanism to supply a sufficient length of twine to permit the formation of a knot in the adjacent ends 15a and 17a.

Looking now to FIGURE 11, it is apparent that the knotter disk 19 has commenced rotation so that the notches 20 and 21 have moved downwardly to substantially the bottom of the disk and immediately above the knife is cut away in an arcuate notch 44 preliminary to its upturned sharpened end 45 which eventually causes a severing of a twine end. It should also be observed in FIGURE 11 that the twine hook has also commenced to rotate, causing the adjacent strands 15a and 17a to be nestled within the crotch of that hook 22. FIGURE 12 shows a succeeding step in the knot formation wherein the cord-holding disk 19 is in substantially the same position but slightly closer to the knife 45 while the knotter hook 22 has rotated substantially causing the twine ends 15a and 17a to completely encircle the hook at its crotch portion. The hook 22 includes a cooperating jaw 46 which, as shown in FIGURE 3, is hinged at 47 to the rear or heel portion 48 of the hook 22. The jaw 46 includes a rear heel member 49 with a roller member 50 thereon which engages a cam track 51 on the back side of the casting 23 causing opening and closing of the jaw at desired points during the knot-tying cycle. The jaw is shown opened relative to the hook 22 in FIGURE 13. Now, continued rotation of the hook 22 causes the strand ends to pass through the open mouth of the hook thus clearly defining a hook-encircled loop 52 for the twine that has preliminarily passed around the hook. The strand ends now pass between the hook 22 and its cooperating jaw 46 such as shown in FIGURE 13. The strand ends remain within the hook in the closed position of the jaw as shown in FIGURE 14.

The depths of the notches 20 and 21 are different. The notch 20 is deeper than the notch 21 and thus the strand end 15a in the notch 20 passes over the knife 45 without cutting whereas the shallower notch 21 carrying the strand end 17a passing the knife is in a position to have the strand cut off as shown at 17b in FIGURE 14. Also, in FIGURE 13, the twine-carrrying needle 16 is pulling away from the knotter mechanism 13 causing a new strand 53 to be laid into a second deep notch 54 in the cord-holding disk 19 which is substantially diametrically opposed to the other deep notch 20. Here again, a shallower notch 55 is provided adjacent the new deep notch 54 for the eventual reception of a new twine brought up by the needle on the next stroke. The new twine end constitutes a continuation of the strand 17a but inasmuch as the strand 17a has been cut by the knife 45 the end thereof 53 passes upwardly through the cord-holding disks 19 and is gripped by the keeper element 19c operating between the disks as previously explained. As shown in FIGURE 14, the new strand 53 is located above the knotter hook 22 by reason of its suspension between the top of the cord-holding disk 19 and the breast plate finger 37.

Movement of the bale 11 rearwardly in the bale-forming chamber 10 as indicated by the arrow in FIGURE 1, causes a pulling on the strand ends from their gripped position by the knotter hook 22. This causes the looped ends 52, as shown in FIGURE 2, to slide over the top of the jaw 46 and cause a knot 56 to be formed in the twine ends and the end portions 15a and 17a gripped by the jaw 46 to make an end loop 57 as shown in FIGURES 2 and 15 in the newly formed knot. In the position as shown in FIGURE 15, wherein the knotter hook 22 has reached its home position, the jaw 46 is raised by force of the loop end 57 on the jaw beak permitting the end loop 57 to be released from its clamping by the knotter hook and permitting the knot 56 to follow the bale 11 as it is discharged from the bale-forming chamber 10. A jaw closing cam spring 73 then returns a cam 74 bearing on the jaw roller 50, and thus the jaw 46, to home position as shown in FIGURE 9 and the newly retained end 53 of a twine strand is held in the cord holder while hay is packed against the end of the strand held by the needle until such time as a full bale is formed whereupon the needle 16 comes up with the end-encircling strand and a new knot is made.

The typing cycle has been described to show the complete environment for the knotter hook which constitutes the invention herein. The knotter hook 22 is shown in detail in FIGURES 2 to 8, inclusive. The hook 22 gets its name primarily from the fact that it appears to be a hook considering the inclusion of the shank 33, the heel portion 48, and the substantially right angle extension 58 having a top surface 80 forming a cord or twine-holding crotch 59 between the bottom portion 58 and the shank 33. The hook further includes a toe portion 60. As best shown in FIGURE 8, a pair of spaced-apart side arms 75 and 76 define an elongated slot 61 extending from a position adjacent the toe 60 rearwardly through the heel 48. It is through this slot 61 that the jaw 46 cooperates with the hook 22. The hinge pin 47 is shown passing through the spaced-apart heel portions 48 of the hook 22 to thereupon provide a hinge for the jaw 46. The toe portion 60 of the hook 22, as shown in FIGURE 3, is provided with an open top groove 62 which forms a longitudinal continuation of the slot 61. The sides of the groove 62 are chamfered as shown in FIGURE 4 at 63 and 64. Similarly, the inner edges of the elongated slot 61 are also chamfered as shown at 65 and 66. However, the chamfer at 65 is somewhat less in degree than the chamfer at 63 in the open top groove 62 in the toe 60 of the hook 22. The detail construction of these chamfers and the notch or groove 62 is shown in FIGURES 4 and 5.

The jaw 46, in addition to having a rearwardly extending heel 49 to be actuated by a cam for opening and closing the forward end of the jaw, includes a main body portion 67 as shown in FIGURE 5 which has a chiesel edge 68 along its under surface. As will be seen in this same figure, the chisel edge acts to crimp the twine end 17a in the hook to prevent unwarranted stripping or pulling out of that end while the knot is stripped from the hook 22. As best shown in FIGURE 7, the outer toe end or beak 69 of the jaw 46 has a hammer-like end 70 which as shown in FIGURE 4 cooperatively engages with the flat bottom of the open top groove 62 in the toe of the hook. The juncture 71 between the chisel edge 68 and the hammer end 70 forms a slightly inclined shoulder which positively prevents the twine from being pulled outwardly through the closed jaw and the hook until the wrap 52 has passed over the twine ends to form the knot loop 57. At this time, the force of the knot loop 57 against the inclined shoulder of the jaw beak causes the jaw 46 to raise about its pivot 47 and release the knot. The jaw closing cam 74 and spring 73 resist the jaw opening and return it to closed position.

A particular feature of the knotter hook 22 of this invention is the relatively long body 58 and toe 60. This insures the positive pickup of bale twined from the breast plate finger. It is apparent that the hook will pick up twines even when they are deflected by trash which so often occurs during baler operation.

A further feature of the knotter hook is the increased width of the hook such that the substantial width increases the amount of twine available for use in making a knot. This insures a substantial length of the loop 57 formed in the resultant knot thereby preventing unwarranted pulling out of the loop from the knot 56.

A further feature of the invention is the curvature 72 of the trailing edge of the hook 22. This trailing edge 72 progressively decreases in width around the heel thereof. Thus the hook at its rear has a smooth curved edge contour. This provides slack twine from the wrap 52 to be pulled through into the bow as the knot is formed. This ultimately provides for easy stripping of the knot from the hook.

In FIGURE 6, the length of the hook from the center line of the shank to the outer end of the toe is designated by the letter "$l$." The width of the hook at the position of the shank 33 is designated by the letter "$w$," whereas, the small width to which the hook tapers at its toe portion is designated by the letter "$w_1$." Generally speaking, the proportions between the length and the widths are as follows: The length is substantially equal to three-halves the width and the small width at the toe end of the hook is approximately one-third the length of the hook. This means that "$l$" equals 3/2 "$w$" and "$w_1$" equals 1/3 "$l$." These approximate proportions of the hook are important to the successful tying of a knot in hay balers. First, as previously stated, the increased length insures positive pickup of bale twines even when the twines are deflected by trash. The increased width provides more twine in a tight wrap on the hook. This gives adequate twin to pull through and make a firm knot with a long bow even when the wrap is tight on the hook. With a tight wrap on the hook the length of bow of the knot formed is directly related to the hook width. A tight wrap of the twine on the hook results when the twine knife 45 becomes dull and does not give a complete cut, or when the narrow slot 20 of the cord holder is restricted. One of the twine ends then is not free to move as the knot begins to form and the originally loose wrap on the hook is pulled tight before the end is free. Of course, this means that the knot must be made with less twine and, therefore, there will be a tighter knot. However, the greater width of the hook provides adequate twine to make a good-sized bow loop on the knot to thereby prevent the bow from slipping through the knot and causing a miss.

In the device as shown in FIGURE 6, it is obvious that the width of the hook identified by $w_1$ progressively increases from the toe 60 to the width "$w$" of the hook at substantially the position of the shank 33.

The curved trailing edge contour 72 of the heel of the knotter hook provides slack twine from the wrap to be pulled through into a bow as the knot is formed. This provides easy stripping of knots from the hook.

The generally longer and wider hook slot contributes to more effective knot formation due to the various conformations of the cooperating jaw. For example, in FIGURE 4 the pronounced chamfer on the inside edges of the groove in the toe portion in cooperation with the narrow jaw beak provides ample room for the bow twines to pass under the wrap to form the knot easily, thus preventing breakage of the knot on the hook. Similarly, in FIGURE 5 the chisel edge on the underside of the central portion of the jaw behind the beak and the high leading edge of the hook combine to insure a firm grip on the twine ends which prevents the short end 17a from slipping between the jaw 46 and the hook 22 and out of the knot as the knot is stripped from the hook, as shown in FIGURE 2. The dash-line position of a completely stripped knot is also shown and made a part of FIGURE 2.

The proportion of the jaw beak height and the chisel edge are such as to make the clamping effect progressive. The jaw does not close completely at first. As the knot starts to form the jaw is forced completely closed by the wrap tightening around the hook and over the jaw. This further increases clamping of the twine ends until the knot is formed. The short twine end is thus held from slipping between the hook and jaw and getting out of the knot.

The sequence of knotter operation is clearly shown in the similar perspective views of FIGURES 9 through 15, while the detailed constructional features of the knotter hook and cooperating jaw are shown in FIGURES 2 through 8, inclusive. It is the combination of all of these various features which jointly contribute to the successful tying of substantially 100 percent of the knots commenced by this knotter. The relative lengths and widths as described and the particular chamfering and cutoffs are extremely important to effective knot tying, and it is urged that the combination of features produces a new and unexpectedly efficiently operating knotter.

We are aware that numerous details of construction may be varied throughout a wide range without departing from the principles disclosed herein, and we therefore do not propose limiting the patent granted hereon otherwise than as indicated by the appended claims.

What is claimed is:

1. A knotter hook for tying a knot in a pair of twine ends comprising a shank, a hook projecting laterally from one end of said shank, said hook having a top surface, a heel portion and a toe portion, a slot formed in said hook, opening in its top surface, and extending laterally of said shank from a position adjacent the outer end of the toe portion to and through said heel portion, said slot being chamfered along its lateral intersection with said top surface, and a jaw mounted within said slot and hinged in the heel portion of said hook to swing down over the top of the toe portion of said hook, said jaw having a chisel edge on its underside adapted to cooperate with the chamfered slot in said hook to prevent unwarranted stripping or pulling out of the twine ends when the knot is stripped from the hook.

2. A knotter hook as set forth in claim 1 in which the toe portion of said hook has a groove in the top surface thereof constituting a continuation of the slot, the inside edges of said groove being chamfered.

3. A knotter hook as set forth in claim 2 in which said jaw has a narrow beak with a flat undersurface for cooperative engagement with said hook groove.

4. A knotter hook as set forth in claim 2 in which said jaw has a broad flat heel substantially filling the slot in said hook.

5. A knotter hook comprising a shank, a hook projecting from one end of said shank, said hook having a heel portion and a toe portion, said hook defining a slot extending from a position adjacent the outer end of said toe portion to and through said heel portion, a jaw mounted within said slot and hinged in the heel portion of said hook to swing down over the top of the toe portion of said hook, the toe portion of said hook defining a groove constituting a continuation of said slot, and said jaw having a flat hammer-type beak for cooperation with said hook groove.

6. A knotter hook as set forth in claim 5 in which said slot and said groove have their inner edges chamfered.

7. A knotter hook comprising a shank, a hook projecting from one end of said shank, said hook having a heel portion and a toe portion, said hook having a slot extending from a position adjacent the outer end of the toe portion to and through said heel portion and having an open top groove with a flat bottom along at least a portion of said outer end of the toe portion, and a jaw mounted within said slot and hinged in the heel portion of said hook to swing down over the top of the toe portion of said hook, said jaw having a beak at the outer end thereof with a flat bottom along at least a portion of said beak for engagement flush with said flat bottom of the groove in said hook and having a chisel edge on the underside from the beak to the hinge of said jaw.

References Cited in the file of this patent

UNITED STATES PATENTS

| | | |
|---|---|---|
| 306,232 | Eavenson | Oct. 7, 1884 |
| 318,809 | Shufelt | May 26, 1885 |
| 1,562,529 | Trumbo | Nov. 24, 1925 |
| 2,793,890 | Smith | May 28, 1957 |

FOREIGN PATENTS

| | | |
|---|---|---|
| 890,115 | France | Oct. 25, 1943 |